United States Patent [19]

Limbacher

[11] Patent Number: 4,653,626
[45] Date of Patent: Mar. 31, 1987

[54] SELF-CENTERING RELEASER FOR A PRESSED-TYPE FRICTION CLUTCH

[75] Inventor: Bernhard Limbacher, Niederwerrn, Fed. Rep. of Germany

[73] Assignee: Fichtel & Sachs AG

[21] Appl. No.: 758,476

[22] Filed: Jul. 24, 1985

[30] Foreign Application Priority Data

Jul. 27, 1984 [DE] Fed. Rep. of Germany ....... 3427792

[51] Int. Cl.$^4$ .............................................. F16D 19/00
[52] U.S. Cl. .................................... 192/98; 192/110 B
[58] Field of Search .............................. 192/98, 110 B

[56] References Cited

U.S. PATENT DOCUMENTS

| 4,327,951 | 5/1982 | Arrowsmith et al. | 192/98 X |
| 4,466,527 | 8/1984 | Billet | 192/110 B X |
| 4,467,904 | 8/1984 | Renaud | 192/98 |
| 4,566,578 | 1/1986 | Leigh-Monstevens et al. | 192/98 |

FOREIGN PATENT DOCUMENTS

| 0047584 | 3/1982 | European Pat. Off. | |
| 2240715 | 3/1973 | Fed. Rep. of Germany | |
| 2855110 | 7/1979 | Fed. Rep. of Germany | 192/98 |
| 0135234 | 10/1980 | Japan | 192/98 |
| 2052001 | 1/1981 | United Kingdom | 192/98 |
| 2058276 | 4/1981 | United Kingdom | 192/98 |

*Primary Examiner*—George H. Krizmanich
*Attorney, Agent, or Firm*—Toren, McGeady and Goldberg

[57] ABSTRACT

A self-centering releaser for a pressed-type motor vehicle friction clutch comprises a sliding sleeve (1) of synthetic plastics material with an integrally formed-on annular flange (3) protruding outwards radially of the sleeve axis and having a flat abutment face (31) on at least one axial side. The releaser further comprises a deep-groove ball bearing (5) radially movably enclosing the sliding sleeve (1) on the side of the abutment face (31), which bearing is fixed on the annular flange (3) by a retaining fitting (7) which radially externally grasps over the ball bearing (5). A spring (29) acting between the retaining fitting (7) and a non-rotating outer race ring (9) of the ball bearing (5) presses the outer race ring (9) through an annular disc (35) against the abutment face (31). The annular disc (35) consists of metal and has an external diameter which is approximately equal to the external diameter of the outer race ring (9) and an internal diameter which is smaller than the internal diameter of the outer race ring (9). The annular disc (35) is held with a collar (37) on the outer race ring (9) and with a collar (39) seals off towards a rotating inner race ring (11) of the ball bearing (5). The annular disc (35) reduces the pressure per unit area on the annular flange (3) and stiffens the annular flange (3). The releaser is distinguished by longer life and a simplified sealing of its ball bearing (5).

6 Claims, 1 Drawing Figure

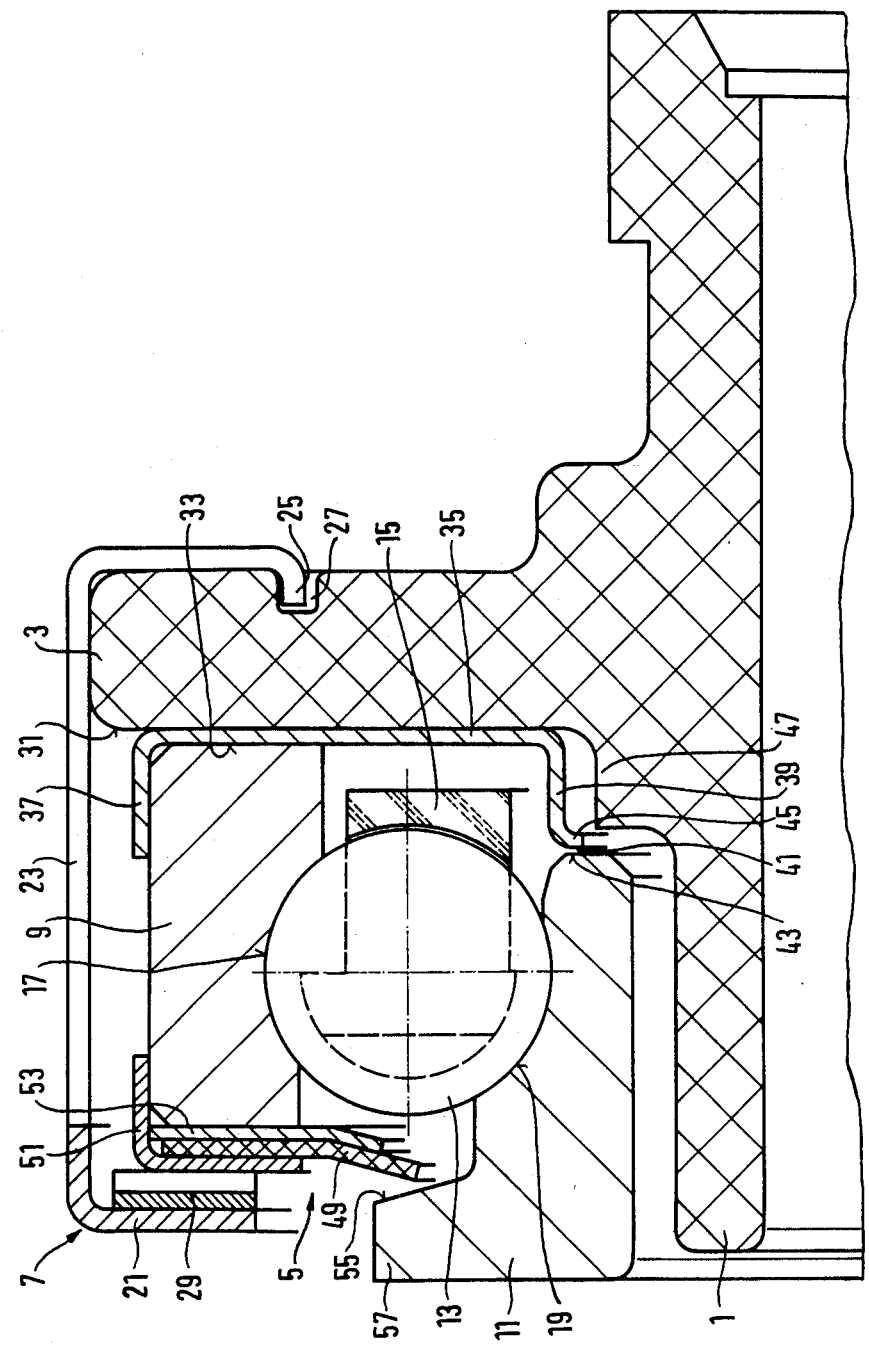

SELF-CENTERING RELEASER FOR A PRESSED-TYPE FRICTION CLUTCH

BACKGROUND OF THE INVENTION

The invention relates to a self-centering releaser for a pressed-type friction clutch and particularly a releaser having a sliding sleeve of synthetic plastics material on which a grooved ball bearing is radially movably guided.

From German Patent No. 2,240,715 a self-centering releaser for a pressed-type motor vehicle friction clutch is known, the sliding sleeve of which consists of synthetic plastics material and comprises an annular flange formed thereon integrally and protruding to the exterior radially of the axis of the sleeve. On the side facing the clutch the annular flange forms a flat abutment face on which an outer race ring of a deep-groove ball bearing is directly supported. The ball bearing lies with its inner race ring against diaphragm spring tongues of the clutch and is freely movable at least in the radial direction in relation to the sliding sleeve and its annular flange. In this case the ball bearing is seated in a retaining fitting secured to the external circumference of the annular flange. A spring braced in between the outer race ring and the retaining fitting presses the outer race ring against the abutment face. On actuation of the clutch the ball bearing lying through the inner race ring against the diaphragm spring, is centered radially against the retaining force of the spring.

Sliding sleeves of synthetic plastics material are ordinarily produced by the injection molding method. This can have the consequence that the abutment face of the annular flange is not completely flat, since the synthetic plastics surface can sink in during casting. Furthermore the synthetic plastics material under pressure loading by the outer race ring tends to creep, which reduces the life of the releaser. Finally two sealing rings arranged axially on both sides of the path of circulation of the balls are necessary for sealing off the ball bearing of the known releaser. The sealing rings are seated in grooves on the internal circumference of the outer race ring and seal off against axial shoulders of the inner race ring. Such sealing rings require additional machining of the outer race ring and the inner race ring, increasing the production expense of the ball bearing.

It is the problem of the invention to lengthen the life of a self-centering releaser of the kind as explained above.

SUMMARY OF THE INVENTION

The invention is here based upon a self-centering releaser for a pressed-type friction clutch particularly of a motor vehicle. The releaser comprises a sliding sleeve of synthetic plastics material with an integrally formed-on annular flange protruding outwards radially of the sleeve axis, having a flat abutment face on at least one axial side. The releaser further comprises a deep-groove ball bearing radially movably enclosing the sliding sleeve on the side of the abutment face, with an inner race ring, an outer race ring and a plurality of balls arranged radially between the inner race ring and the outer race ring. A retaining fitting grasping radially externally over the outer race ring is secured on the annular flange and has on the side of the outer race ring remote from the annular flange in the direction of the sleeve axis a radially inwardly protruding collar. Between the collar and the outer race ring a spring is braced which initially stresses the outer race ring towards the abutment face of the annular flange. In such a releaser the ball bearing can center itself on actuation of the friction clutch. The spring effects a friction force which holds the ball bearing in the centered position.

The improvement in accordance with the invention consists in that an annular disc consisting of metal is arranged axially between the outer race ring and the abutment face of the annular flange and rests flat on the abutment face of the annular flange with a flat annular face the external diameter of which is approximately equal to the external diameter of the outer race ring and the internal diameter of which is smaller than the internal diameter of the outer race ring. The annular disc reduces the pressure per unit area exerted by the outer race ring upon the abutment face of the annular flange and stiffens the annular flange. The annular disc extends over substantially the entire radial height of the annular flange, apart from the differences of dimension necessary for radial self-centering. In this way the annular flange is not only stiffened against elastic deformation during the disengagement of the clutch, but also the creeping of the synthetic plastics material, which otherwise occurs in the long term, is effectively prevented. The annular disc further evens out slight irregularities of the abutment face of the annular flange which can occur for example during the injection molding of the sliding sleeve due to local falling in of the synthetic plastics surface. Such irregularities can otherwise be compensated only by comparatively expensive subsequent swarf-removing machining. Since the outer race ring of the ball bearing abuts directly on the annular disc, the essential advantage of better sealing of the ball bearing to the exterior is also obtained, whereby the lubricant of the ball bearing can be retained longer in the region of the rotating inner race ring and of the balls. This likewise is to the benefit of increasing the life.

In a preferred embodiment the annular disc consisting of metal is provided on its external circumference with a cylindrical outer collar closely enclosing the outer race ring. The collar secures the annular disc on the outer race ring. The annular disc thus follows the centering movement of the ball bearing and the outer collar improves the seal. A collar can likewise be provided on the internal circumference of the annular disc. This inner collar reaches substantially completely, but without contacting the inner race ring, to the inner race ring. Thus except for a relatively narrow gap the annular disc also seals off the ball bearing in relation to the inner race ring. The seal can be improved if the sliding sleeve comprises axially between the end face and the annular flange an annular step enclosed by the inner collar. In this way a labyrinth packing is produced which also largely prevents soiling of the abutment face of the annular flange.

The various features of novelty which characterize the invention are pointed out with particularity in the claims annexed to and forming a part of this disclosure. For a better understanding of the invention, its operating advantages and specific objects attained by its use, reference should be had to the accompanying drawing and and descriptive matter in which there is illustrated and described a preferred embodiment of the invention.

BRIEF DESCRIPTION OF THE DRAWING

The drawing shows a partial axial longitudinal section through a self-centering releaser for a pressed-type motor vehicle friction clutch.

DETAIL DESCRIPTION OF THE DRAWING

The releaser comprises a sliding sleeve 1 produced by the injection-molding method from synthetic plastics material, from the external circumference of which an integrally i.e. monolithically formed-on, surrounding annular flange 3 protrudes radially. On the side of the annular flange 3 facing the clutch in the installed condition a deep-groove ball bearing 5 encloses the sliding sleeve 1. The ball bearing 5 is held by a retaining fitting 7 radially movably on the annular flange 3 so that it can center itself in relation to the axis of rotation of the clutch. The ball bearing 5 comprises a non-rotating outer race ring 9, a rotating inner race ring 11 co-operating with the release elements of the clutch and a plurality of balls 13 distributed in the circumferential direction, which rotate in grooves 17, 19 of the outer race ring 9 and the inner race ring 11 respectively under guidance by a cage 15 in the rotation of the inner race ring 11.

The retaining fitting 7 has an annular cap 21 which engages radially before the outer race ring 9 on the side remote from the annular flange 3. From the annular cap 21 several extensions 23 of finger form protrude axially. The extensions 23 grasp over the outside of the outer race ring 9 and are anchored with their ends 25 on the side of the annular flange 3 axially remote from the ball bearing 5 in openings 27 of the annular flange. The extensions 23 are radially elastic in order that the retaining fitting 7 may be fitted on the annular flange in the assembly of the releaser. Axially between the annular cap 21 and the outer race ring 9 a corrugated spring 29 is arranged which presses the outer race ring 9 against a flat abutment face 31 of the annular flange 3 which is normal to the axis and extends substantially over the entire radial height of the annular flange 3. Axially between the similarly flat end face 33 of the outer race ring 9, facing the abutment face 31, and the abutment face 31 there is arranged an annular disc 35 consisting of metal. The annular disc 35 lies radially movably against the abutment face 31. The external diameter of the annular disc 35 is made substantially equal to the external diameter of the outer race ring 9. The internal diameter of the annular disc 35 is smaller than the internal diameter of the outer race ring 9. The annular disc 35 lies flat on the abutment face 31 and its radial contact region is substantially equal to the radial dimension of the abutment face 31, except for the movement clearance necessary for the radial self-centering of the ball bearing 5. The annular disc 35 evens out production irregularities of the abutment face 31 and reduces the pressure per unit area exerted by the outer race ring 9 upon the annular flange 3. Furthermore the annular disc 35 stiffens out the annular flange 3 and prevents long-term creeping of the synthetic plastics material.

On its external circumference the annular disc 35 carries a collar 37 closely grasping radially externally around the outer race ring 9 and holding the annular disc 35 on the outer race ring 9. The end face 33 of the outer race ring 9, abutting on the annular disc 35, and the collar 37 seal off the ball bearing 5 to the exterior, so that the lubricant of the ball bearing 5 cannot escape.

In the region of its internal circumference the annular disc 35 carries a collar 39 which reaches, except for a narrow gap 41, as far as the end face 43 of the inner race ring 11 facing the annular flange 3. In the region of the end face 43 the collar 39 terminates in a radially inwardly pointing bent-off portion 45. The collar 39 covers a step 47 on the foot of the annular flange 3 which annularly encloses the sliding sleeve 1 and together with the collar 39 and its bent-off portion 45 and with the end face 43 of the inner race ring 11 forms a labyrinth packing which protects both the interior of the ball bearing 5 and the abutment face 31.

The side of the ball bearing 5 axially remote from the annular flange 3 is sealed off by a rubber-elastic sealing ring 49 of disc form which is held on the outer race ring 9 by an annular cap 51 set upon the outer race ring 9 and pressed by the corrugated spring 29 against the outer race ring 9. Between the sealing ring 49 and the outer race ring 9 a support ring 53 is arranged which deflects the sealing ring 49 to an axial shoulder 55 on the side of the inner race ring 11 facing the balls 13. The securing of the sealing ring 49 as described above requires no special machining of the outer race ring 9 or of the inner race ring 11. The shoulder 55 is formed by the back of an abutment flange 57 of the inner race ring 11 which in any case has to be provided for the actuation of the release elements of the clutch, for example its diaphragm spring tongues.

While specific embodiments of the invention have been shown and described in detail to illustrate the application of the inventive principles, it will be understood that the invention may be embodied otherwise without departing from such principles.

I claim:

1. A self-centering releaser for a pressed-type friction clutch, comprising:
   (a) a sliding sleeve of synthetic plastics material having an integrally formed-on annular flange protruding radially outwards in relation to an axis of the sliding sleeve, said annular flange having on at least one axial side a flat abutment face,
   (b) a groove ball bearing radially movably enclosing the sliding sleeve on the axial side of the abutment face, having an inner race ring, an outer race ring and a plurality of balls arranged radially between the inner race ring and the outer race ring;
   (c) a retaining fitting grasping radially externally over the outer race ring and secured on the annular flange, said fitting comprising a radially inwardly protruding support part on the side of the outer race ring remote from the annular flange in the direction of the sleeve axis,
   (d) a spring braced in between the support part and the outer race ring and stressing the outer race ring towards the abutment face of the annular flange,
   (e) an annular disc formed of metal arranged axially between the outer race ring and the abutment face of the annular flange and having a flat annular face lying flat on the abutment face of the annular flange, said annular face having an external diameter which is approximately equal to the external diameter of the outer race ring and an internal diameter which is smaller than the internal diameter of the outer race ring, and said annular disc having an external circumference and an internal circumference relative to the axis of said sliding sleeve, said annular disc is secured to said outer race ring at the external circumference of said annular disc and the internal circumference of said annular disc is located closely adjacent said inner race ring for sealing said ball bearing.

2. Releaser according to claim 1, wherein the annular disc comprises on its external circumference a cylindrical outer collar which closely encloses the outer race ring.

3. Releaser according to claim 1, wherein the annular disc comprises on its internal circumference an inner collar protruding towards the inner race ring, said collar reaching substantially completely to the inner race ring without however contacting it.

4. Releaser according to claim 3, wherein the inner collar extends in the region of the inner race ring parallel to an end face of the inner race ring lying opposite to the abutment face.

5. Releaser according to claim 4, wherein the sliding sleeve comprises an annular step enclosed by the inner collar axially between the end face and the annular flange.

6. A self-centering releaser for a pressed-type friction clutch,
   (a) a sliding sleeve of synthetic plastics material having an integrally formed-on annular flange protruding radially outwards in relation to an axis of the sliding sleeve, said annular flange having on at least one axial side a flat abutment face,
   (b) a groove ball bearing radially movably enclosing the sliding sleeve on the axial side of the abutment face, having an inner race ring, an outer race ring and a plurality of balls arranged radially between the inner race ring and the outer race ring,
   (c) a retaining fitting grasping radially externally over the outer race ring and secured on the annular flange, said fitting comprising a radially inwardly protruding support part on the side of the outer race ring remote from the annular flange in the direction of the sleeve axis,
   (d) a spring braced in between the support part and the outer race ring and stressing the outer race ring towards the abutment face of the annular flange,
   (e) an annular disc formed of metal arranged axially between the outer race ring and the abutment face of the annular flange and having a flat annular face lying flat on the abutment face of the annular flange, said annular face having an external diameter which is approximately equal to the external diameter of the outer race ring and an internal diameter which is smaller than the internal diameter of the outer race ring, the inner race ring has on the side of the balls remote from the annular flange an annular shoulder directed towards the balls,
   wherein between the spring and the outer race ring there is arranged an annular cap radially fixed on the external circumference of the outer race ring,
   and wherein an annular sealing disc is held between the annular cap and the outer race ring and reaches with its internal circumference substantially to the annular shoulder.

* * * * *